(12) United States Patent
Nakada

(10) Patent No.: US 11,561,747 B2
(45) Date of Patent: Jan. 24, 2023

(54) INFORMATION PROCESSING APPARATUS AND NON-TRANSITORY COMPUTER READABLE MEDIUM STORING PROGRAM FOR REDUCING THE NUMBER OF OPERATION STEPS OF A USER

(71) Applicant: FUJIFILM Business Innovation Corp., Tokyo (JP)

(72) Inventor: Misaki Nakada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/372,563

(22) Filed: Jul. 12, 2021

(65) Prior Publication Data

US 2022/0222021 A1 Jul. 14, 2022

(30) Foreign Application Priority Data

Jan. 14, 2021 (JP) .............................. JP2021-004264

(51) Int. Cl.
  *G06F 3/12* (2006.01)
  *G06F 3/04842* (2022.01)
  *H04N 1/00* (2006.01)
(52) U.S. Cl.
  CPC ........ *G06F 3/1235* (2013.01); *G06F 3/04842* (2013.01); *G06F 3/1204* (2013.01); *G06F 3/1258* (2013.01); *H04N 1/00411* (2013.01)
(58) Field of Classification Search
  CPC ..................................................... G06F 3/1235
  USPC ............................................. 358/1.15, 1.14
  See application file for complete search history.

(56) References Cited

U.S. PATENT DOCUMENTS

| | | | |
|---|---|---|---|
| 8,997,010 B2 | 3/2015 | Motosugi et al. | |
| 2007/0253015 A1* | 11/2007 | Eguchi | H04N 1/4433 358/1.14 |
| 2009/0094554 A1* | 4/2009 | Karstens | G06F 3/04817 715/810 |
| 2018/0143795 A1* | 5/2018 | Masuzawa | G06F 3/1229 |

FOREIGN PATENT DOCUMENTS

| | | |
|---|---|---|
| JP | 2008059484 | 3/2008 |
| JP | 4811484 | 11/2011 |

OTHER PUBLICATIONS

"Search Report of Europe Counterpart Application", dated Mar. 1, 2022, pp. 1-7.

* cited by examiner

*Primary Examiner* — Jacky X Zheng
(74) *Attorney, Agent, or Firm* — JCIPRNET

(57) ABSTRACT

An information processing apparatus includes a processor configured to acquire first information that is information on an apparatus associated with one selection element selectable by a user, and second information that is information on the apparatus associated with another selection element selectable by a user; display the first information, in a case where the one selection element is selected, and display the second information instead of the first information, in a case where the other selection element is selected, on a display unit that displays the one selection element and the other selection element; and display the second information associated with the first information, without performing an operation of selecting the other selection element, in a case where the first information is displayed on the display unit.

9 Claims, 10 Drawing Sheets

FIG. 4

| DETECTION TARGET SCREEN | TARGET USER OPERATION | RELATED INFORMATION TO BE DISPLAYED | DISPLAY POSITION |
|---|---|---|---|
| UPLOAD PRINT | FILE SELECTED FILE DROPPED | CONSUMABLES INFORMATION TRAY INFORMATION | LOWER PART OF PRINT BUTTON |
| CONFIDENTIAL BOX | FILE SELECTED AND PRINT BUTTON PRESSED | JOB INFORMATION | LOWER PART OF PRINT BUTTON |
| SYSTEM SETTINGS | SETTING CHANGED AND SAVE BUTTON HOVERED | MARGIN STATE | UPPER PART OF SAVE BUTTON |

INFORMATION PROCESSING APPARATUS AND NON-TRANSITORY COMPUTER READABLE MEDIUM STORING PROGRAM FOR REDUCING THE NUMBER OF OPERATION STEPS OF A USER

CROSS-REFERENCE TO RELATED APPLICATIONS

This application is based on and claims priority under 35 USC 119 from Japanese Patent Application No. 2021-004264 filed Jan. 14, 2021.

BACKGROUND

(i) Technical Field

The present invention relates to an information processing apparatus and a non-transitory computer readable medium storing a program.

(ii) Related Art

For example, JP2008-059484A discloses a process in which a printer driver UI control module detects that a control displayed in a non-settable state on a user interface screen is indicated by a cursor, inputs the current setting information set on the UI screen into a conflict engine, and in a case where the conflict engine changes the priority of the control indicated by the cursor, the printer driver UI control module acquires update setting information for transitioning to the settable control, and displays an operation instruction message for transitioning a control in a non-settable state to a control that can be set, based on the update setting information.

SUMMARY

Here, a mode is considered in which plural selection elements are displayed on a display unit of the information processing apparatus that remotely controls the apparatus. The information on the apparatus is associated with each of the plural selection elements, and the information is displayed by switching a part of the display unit, according to the selection of the selection element by a user. In this case, when the information on one selection element is displayed, in a case where the information on another selection element other than one selection element is to be referred to, the screen needs to be switched, by the other selection element being selected.

Aspects of non-limiting embodiments of the present disclosure relate to an information processing apparatus and a non-transitory computer readable medium storing a program that reduce the number of operation steps of the user, as compared with the case where information, other than the information displayed by one selection element being selected, is not displayed unless another selection element is selected.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire first information that is information on an apparatus associated with one selection element selectable by a user, and second information that is information on the apparatus associated with another selection element selectable by a user; display the first information, in a case where the one selection element is selected, and display the second information instead of the first information, in a case where the other selection element is selected, on a display unit that displays the one selection element and the other selection element; and display the second information associated with the first information, without performing an operation of selecting the other selection element, in a case where the first information is displayed on the display unit.

BRIEF DESCRIPTION OF THE DRAWINGS

Exemplary embodiment(s) of the present invention will be described in detail based on the following figures, wherein:

FIG. 3A shows a screen configuration, FIG. 3B shows a case where a Home tab is selected, and FIG. 3C shows a case where a My page tab is selected;

FIG. 4 is a related information display correspondence table stored in a storage unit;

FIGS. 6A and 6B are views for explaining a first exemplary embodiment in which related information is displayed on a display unit, in which FIG. 6A shows a state where a file to be uploaded and printed is selected and operated, and FIG. 6B shows a state where the print operation is to be performed after FIG. 6A;

FIGS. 7A and 7B are views for explaining a second exemplary embodiment in which related information is displayed on a display unit, in which FIG. 7A shows a state where a file to be uploaded and printed is selected and operated, and FIG. 7B shows a state where the print operation is to be performed after FIG. 7A;

FIGS. 8A and 8B are views for explaining a third exemplary embodiment in which related information is displayed on a display unit, in which FIG. 8A shows a state where a file is selected and operated in a confidential box, and FIG. 8B shows a state where the print operation is to be performed after FIG. 8A;

FIGS. 9A to 9C are views for explaining a fourth exemplary embodiment in which related information is displayed on a display unit, in which FIG. 9A shows a state where a file is selected and operated in a confidential box, FIG. 9B shows a state where the print operation is to be performed after FIG. 9A, and FIG. 9C shows a state where the print operation is performed; and FIGS. 10A to 10C are views for explaining a fifth exemplary embodiment in which related information is displayed on a display unit, in which FIG. 10A shows a state where sound setting is performed in system settings, FIG. 10B shows a state where the sound setting is changed after FIG. 10A, and FIG. 10C shows a state where the change in the sound setting is to be saved.

DETAILED DESCRIPTION

Hereinafter, exemplary embodiments of the present invention will be described in detail with reference to the accompanying drawings.

Figure 1:
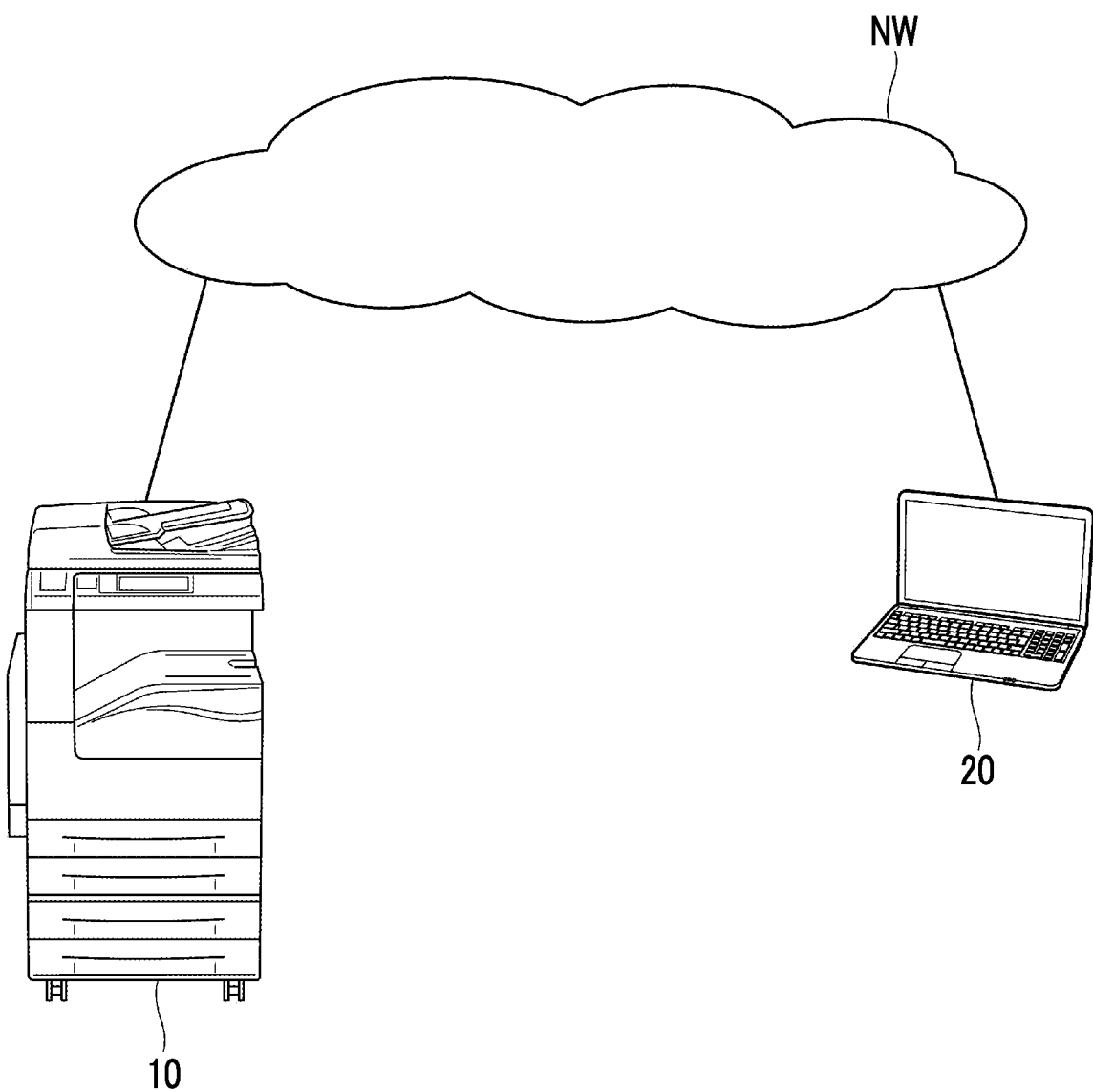
FIG. 1 is a diagram schematically showing an example of the overall configuration of a document management system used in the present exemplary embodiment.

FIG. 1 is a diagram schematically showing an example of the overall configuration of a document management system 1 used in the present exemplary embodiment.

The document management system 1 shown in FIG. 1 is configured to include a network NW, an image forming apparatus 10 for forming an image, and a user terminal 20 operated by a user who uses the system. The image forming apparatus 10 is an example of an apparatus, and the user terminal 20 is an example of an information processing apparatus.

Examples of documents in the present exemplary embodiment include office documents created by office software or other application programs, e-mails, image data optically read from documents, facsimile documents, and the like.

For the network NW, for example, Local Area Network (LAN) or the Internet is used. However, the network NW may have a composite configuration of a LAN and the Internet.

The user terminal 20 is, for example, a notebook computer, a desktop computer, a tablet computer, a smartphone, or an image forming apparatus, and is used for uploading a document or downloading a document to or from a shared server.

The user terminal 20 is provided with a web application capable of remotely controlling the image forming apparatus 10, and can use the image forming apparatus 10 for various purposes even in a case where the user terminal 20 is not near the image forming apparatus 10.

The user terminal 20 includes a motherboard on which a circuit for processing data is integrated, a storage for storing data, a display used for displaying information, a touch panel and a keyboard used for inputting operations, and a communication module used for communication with a network NW.

The motherboard is provided with, for example, a processor, a Random Access Memory (RAM) used as an execution area of a program, a Read Only Memory (ROM) that stores a Basic Input/Output System (BIOS), and the like.

Further, a hard disk apparatus or a rewritable non-volatile semiconductor memory is used for the storage.

Although one user terminal 20 is drawn in FIG. 1, plural user terminals 20 may be used.

In addition to the function of printing an image on paper, the image forming apparatus 10 also has a function of optically reading an image of a document or the like, and a function of executing facsimile communication. The image forming apparatus 10 is also called a multifunction apparatus. The functions listed for the image forming apparatus 10 are merely examples, and do not prevent the image forming apparatus 10 from being provided with other functions.

The document management system 1 may include a shared server that provides a cloud service that supports document sharing. In addition to the case where the shared server referred to here is one, the shared server may be physically configured with plural servers. For example, the shared server may be configured as a so-called cloud server. However, the shared server may be an on-premises server.

Figure 2:
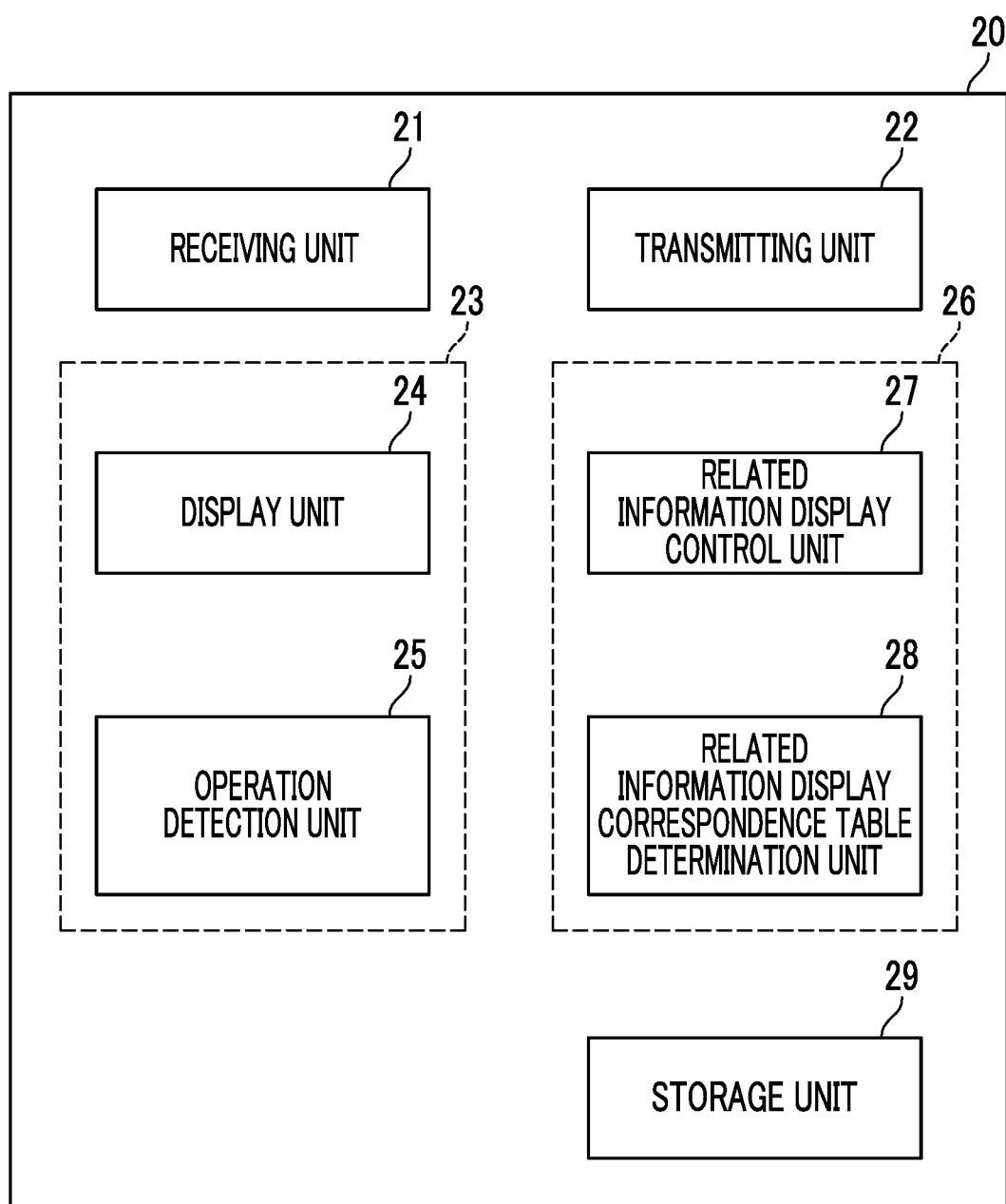
FIG. 2 is a block diagram illustrating functions of a user terminal.

FIG. 2 is a block diagram illustrating the functions of the user terminal 20.

As shown in FIG. 2, the user terminal 20 includes a receiving unit 21, a transmitting unit 22, a display 23, a control unit 26, and a storage unit 29.

The receiving unit 21 receives information from the outside of the image forming apparatus 10 and the like, and the transmitting unit 22 transmits the information to the outside of the image forming apparatus 10 and the like.

The display 23 has a display unit 24 and an operation detection unit 25. The display unit 24 displays an image by a web application that remotely controls the image forming apparatus 10. The operation detection unit 25 detects the coordinates operated by the user on the display unit 24.

The control unit 26 includes a related information display control unit 27 and a related information display correspondence table determination unit 28. The related information display control unit 27 displays the related information corresponding to the operation on the display unit. The related information display correspondence table determination unit 28 determines whether or not the detected user operation is an operation present in the related information display correspondence table.

The storage unit 29 stores the related information display correspondence table. The storage unit 29 is configured by the above-described storage.

Figure 3A:
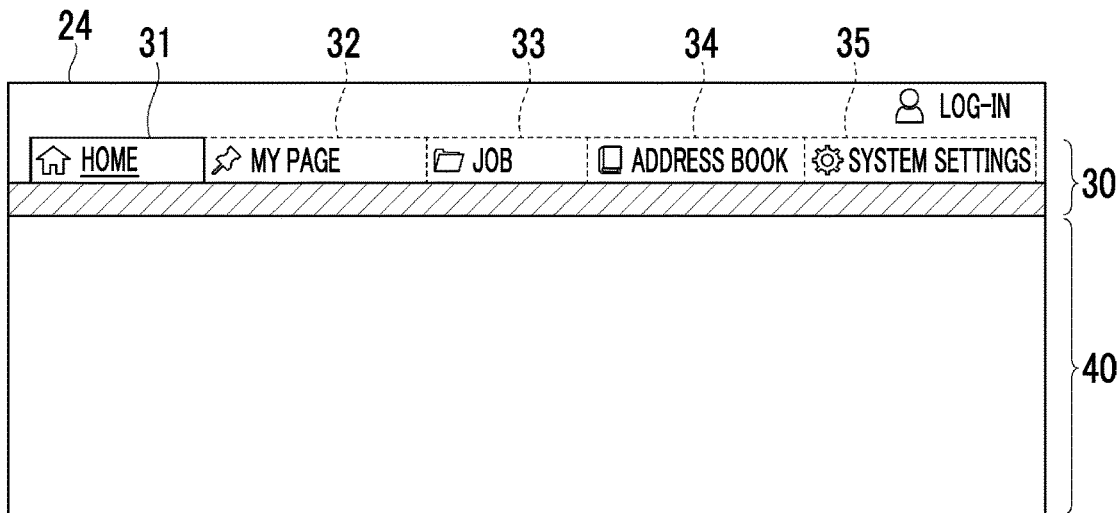
FIGS. 3A to 3C are views of a screen in which a Web application is displayed on a display unit of the user terminal.
Figure 3B:
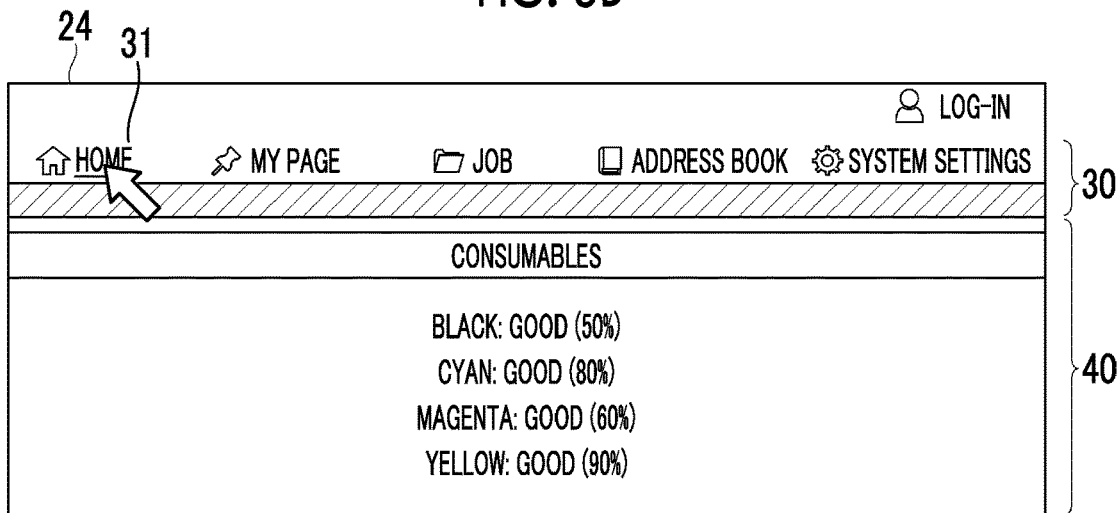
Figure 3C:
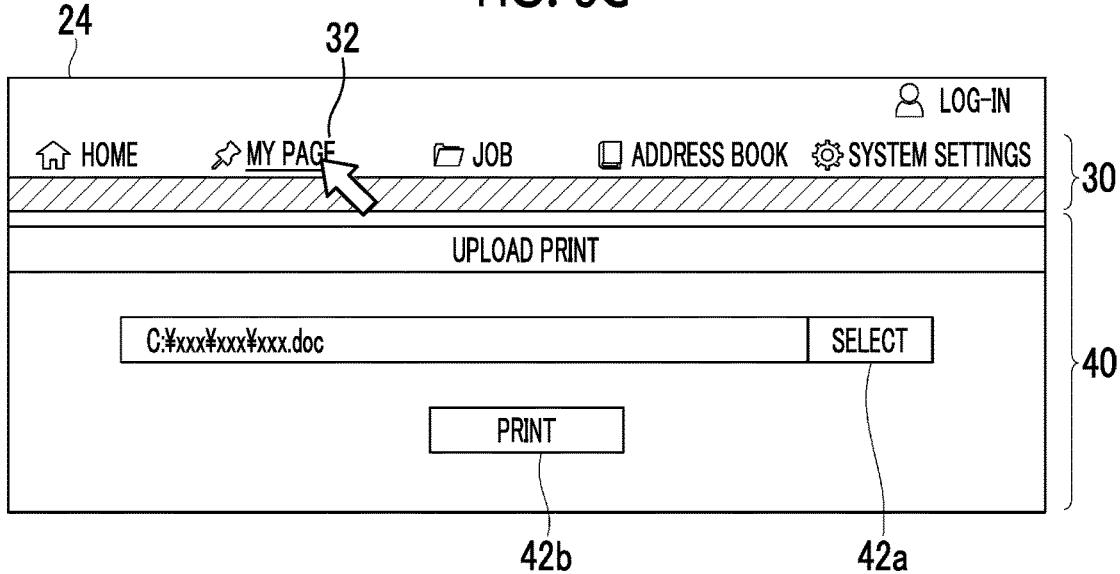

FIGS. 3A to 3C are views of a screen in which a Web application is displayed on the display unit 24 of the user terminal 20, FIG. 3A shows a screen configuration, FIG. 3B shows a case where a Home tab is selected, and FIG. 3C shows a case where a My page tab is selected. The diagonal arrow figures shown in FIGS. 3B and 3C are mouse cursors. The same applies to the drawings after FIGS. 6A and 6B.

As shown in FIG. 3A, the screen of the display unit 24 is configured to include a tab area 30 in which plural tabs 31, 32, 33, 34, and 35 by which the user performs a selection operation are displayed, and a display area 40 in which information corresponding to each of the tabs 31 to 35 is displayed. The screen is a User Interface (UI) divided into multiple screens for each category.

The tab name of tab 31 is "Home", the tab name of tab 32 is "My Page", the tab name of tab 33 is "Job", the tab name of tab 34 is "Address Book", and the tab name of tab 35 is "System settings". On the screen after selecting any of tabs 31 to 35, the wanted content can be displayed by scrolling.

In a case where the tab 31 of "Home" is selected and operated by the user, as shown in FIG. 3B, the display area is switched to the screen including the information associated with "Home", and in a case where the tab 32 of "My page" is selected and operated, as shown in FIG. 3C, the display area 40 is switched to the screen including the information associated with "My page".

More specifically, the tab 31 of "Home" is associated with tray information indicating the state of a tray mounted on the paper feed unit of the image forming apparatus 10, and consumables information such as cartridge information indicating the state of the toner used for development.

On the screen of the consumables shown in FIG. 3B, information regarding the toner as cartridge information of the image forming apparatus 10 is displayed in the display area 40. On the consumables screen, tray information may be displayed with or in place of the cartridge information. In this way, on the consumables screen, information indicating the state of the consumables of the image forming apparatus 10 is displayed.

The information regarding the toner includes information indicating whether or not the toner needs to be replaced and information indicating the proportion of remaining amount, for each color of the toner. Therefore, the information regarding the toner of the image forming apparatus 10 can be displayed on the display unit by the tab 31 of the "Home" of the user terminal 20.

The tray information described above includes information indicating the remaining amount of the recording medium or paper housed in the image forming apparatus 10.

Further, tab 32 of "My Page" is associated with information regarding the confidential box and the upload print, in addition to personal job information that is frequently used by individuals among the job information pieces displayed by selecting tab 33 of "Job".

On the upload print screen shown in FIG. 3C, an area 42a for selecting a document to be uploaded and an area 42b for instructing the execution of printing are displayed in the display area 40.

Here, the receiving unit 21 (see FIG. 2) of the user terminal 20 receives various types of information on the image forming apparatus 10 (see FIG. 1), and the information is displayed on the display unit 24. The tabs 31 to 35 displayed in the tab area 30 of the display unit 24 in FIG. 3A are selection elements that can be selected by the user.

In the present exemplary embodiment, the tab 32 is associated with the information displayed in the display area 40 of FIG. 3C, and the tab 31 is associated with the information displayed in the display area 40 of FIG. 3B. In a case where the tab 32 is an example of one selection element selectable by the user, at least a part of the information displayed in the display area 40 of FIG. 3C by the tab 32 being selected is an example of the first information. In a case where the tab 31 is an example of another selection element selectable by the user, at least a part of the information displayed in the display area 40 of FIG. 3B by the tab 31 being selected is an example of the second information.

The first information referred to here refers to information on the image forming apparatus 10 associated with one selection element that can be selected by the user, and information displayed on the display unit 24 in a case where one selection element is selected in the user terminal 20. The second information referred to here refers to information on the image forming apparatus 10 associated with another selection element that can be selected by the user, and information displayed on the display unit 24 in a case where the other selection element is selected in the user terminal 20.

FIG. 4 is a related information display correspondence table stored by the storage unit 29.

In the related information display correspondence table illustrated in FIG. 4, "Upload print", "Confidential box", and "System settings" are shown in a field for detection target screen. "Upload print" and "Confidential box" are displayed in a case where the tab 32 (see FIG. 3A) of "My Page" is selected and operated, and "System settings" is displayed in a case where the tab 35 (see FIG. 3A) of "System settings" is selected and operated.

The related information display correspondence table includes a field for target user operation, a field for related information to be displayed, and a field for display position, in addition to the field for detection target screen. The field for target user operation is an example of the user operation, and is an example of an operation of giving an operation instruction to the image forming apparatus 10. The field for related information to be displayed is an example of information regarding the operation of the image forming apparatus 10 corresponding to the operation instruction.

In a case where the detection target screen is "Upload print", the field for target user operation is considered to be "File selected" or "File dropped", and the field for related information to be displayed is "Consumables information" and "Tray information", and the field for display position is "Lower part of the print button".

In the case of "confidential box", the field for target user operation is "Select a file and press the print button", the field for related information to be displayed is "Job information", and the field for display position is "Lower part of the print button".

In the case of "System settings", the field for target user operation is "Change settings and hover to the save button", the field for related information to be displayed is "Machine state", and the field for display position "Upper part of the save button".

The term "hover" as used herein refers to an operation of moving the mouse cursor to the save button. In the case of the user terminal 20, who is not familiar with the operation method of moving the mouse cursor, the operation method may be changed such that when the save button is pressed once, this operation may be determined that the user "has hovered". In the case of such an operation method, the execution instruction of saving is given by pressing the save button for the second time.

Further, the "Machine state" referred to here refer to the state of the image forming apparatus 10, a state where the image forming apparatus 10 is in the job of printing operation, a state where another user changes the setting by directly operating the panel of the image forming apparatus 10 instead of the user terminal 20, or the like is displayed as related information. The operation of changing the setting by the user terminal 20 has a lower priority than the case of the direct operation of the image forming apparatus 10, and the setting cannot be changed by the user terminal 20 until the direct operation is ended, so that such a display is made.

Examples of the setting of the image forming apparatus 10 include setting whether or not to output a sound when the job is completed, or setting the volume, or the like (see FIGS. 10A to 10C described later).

More specifically, the field for related information to be displayed is not the information to be displayed on the display unit 24 by the tab that switches the screen into the detection target screen by being selected and operated, but the information displayed by another tab being selected and operated.

Specifically, in a case where the tab 32 of "My Page" is selected and "Upload Print" is displayed, the field for related information to be displayed is consumables information and tray information displayed by the tab 31 of "Home" being selected. Similarly, in a case where the tab 32 of "My Page" is selected and the "Confidential Box" is displayed, the field for related information to be displayed is the job information displayed by the tab 33 of "Job" being selected. Further, in a case where the tab 35 of "System settings" is selected, the field for related information to be displayed is the machine information displayed by the tab 33 of "Job" being selected.

In the field for related information to be displayed, the consumables information is an example of information indicating the state of the consumables of the image forming apparatus 10, and the tray information is an example of information indicating the remaining amount of the recording medium housed in the image forming apparatus 10. Further, the job information is an example of information indicating the operating state of the image forming apparatus 10.

In addition, the configuration may be such that all or part of the related information display correspondence table can be changed by the user. For example, in a case where the field for display position can be changed according to the user's preference, the operability is improved. Further, although three patterns are set in the related information display correspondence table, it may be possible to change so as to increase or decrease the number of patterns. In that case, a check box that can be selected by the user may be included, and the usability of the user may be improved by turning on/off the check box.

Figure 5:
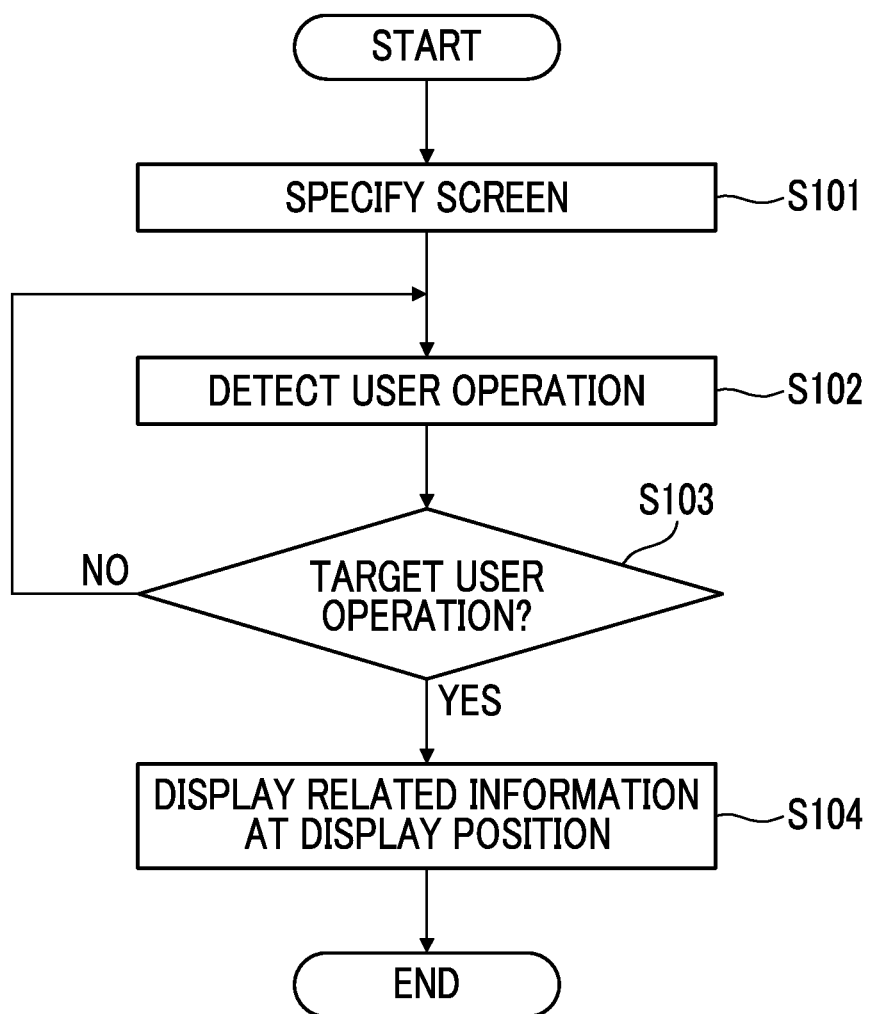
FIG. 5 is a flowchart showing a processing procedure according to the present exemplary embodiment.

FIG. 5 is a flowchart showing a processing procedure according to the present exemplary embodiment.

In the processing example shown in FIG. 5, in the user terminal 20, after the screen of the display unit 24 is specified (step S101), in a case where the operation detection unit 25 detects a user operation (step S102), it is determined whether or not the detected user operation is a target user operation on the detection target screen (step S103). Specifically explaining the determination, the related information display correspondence table determination unit 28 refers to the related information display correspondence table (see FIG. 4), and determines whether or not a combination of the detection target screen and the detected user operation is present in the related information display correspondence table.

In a case where it is determined that the detected user operation is the target user operation on the detection target screen (Yes in step S103), the related information display control unit 27 displays the related information at the display position, according to the field for related information to be displayed and the field for display position, in response to the operation (step S104).

In a case where it is not determined that the detected user operation is the target user operation on the detection target screen (No in step S103), the process returns to step S102.

In this way, in a case where a combination of the screen having the predetermined tabs 31 to 35 and the user operation is detected on the display unit 24, even in a case where a tab different from the current tab is not selected, information regarding another tab is displayed in a state where the current tab is selected. In other words, without switching to the screen of another tab, the information, which is related to the display information and displayed by the other tab, is added to the information displayed in the current tab.

Hereinafter, a specific example will be described.

Figure 6A:
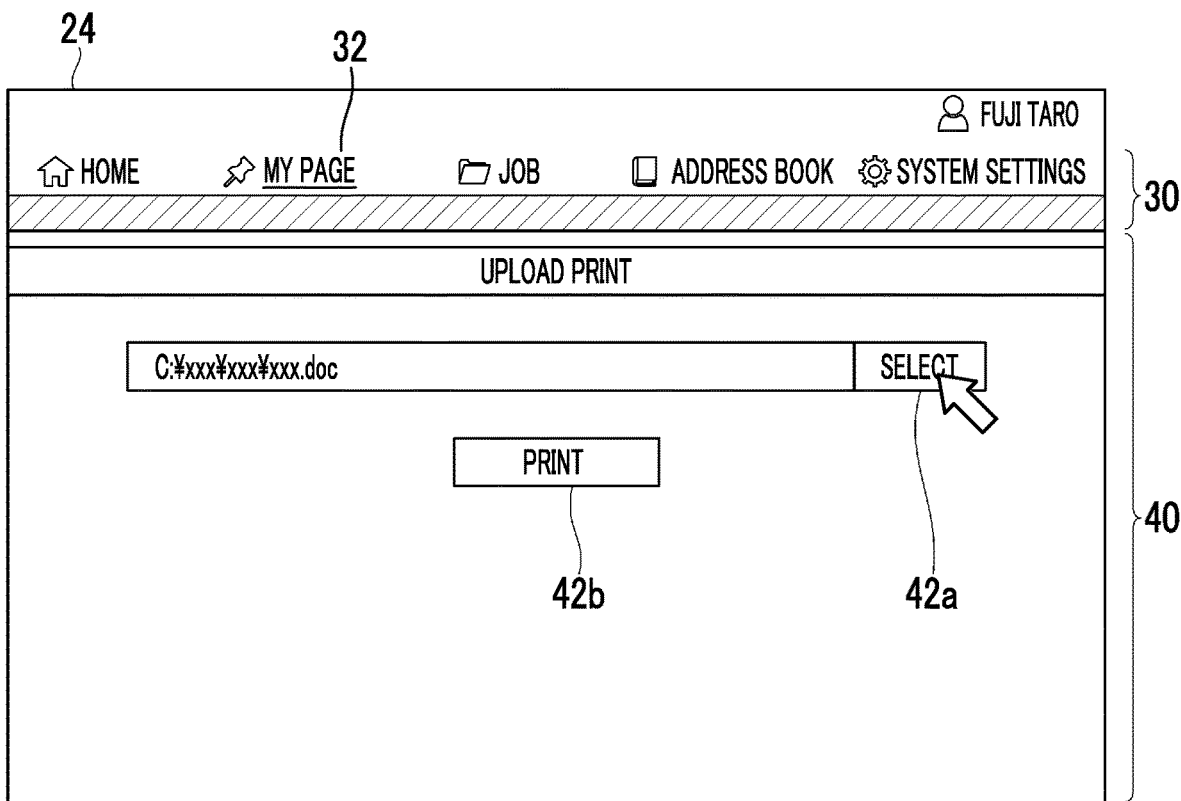
Figure 6B:
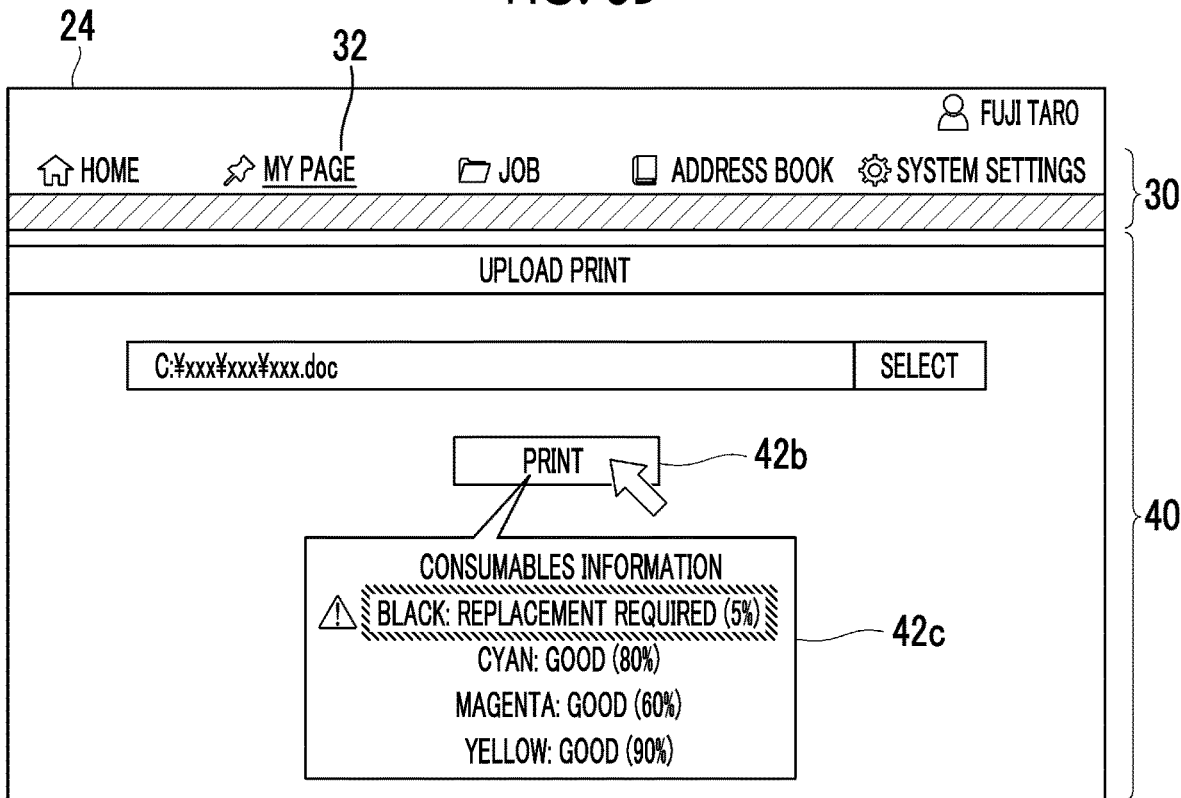

FIGS. 6A and 6B are views for explaining a first exemplary embodiment in which related information is displayed on the display unit 24, in which FIG. 6A shows a state where a file to be uploaded and printed is selected and operated, and FIG. 6B shows a state where the print operation is to be performed after FIG. 6A.

As shown in FIG. 6A, in a case where the tab 32 of "My Page" in the tab area 30 of the display unit 24 is selected and operated and the screen shifts to the upload print screen, the above-described area 42a and area 42b are displayed in the display area 40 (see FIG. 3C). The user selects a file to upload in the area 42a.

In a case where the file to be uploaded is selected on the screen where the tab 32 of "My Page" is selected and operated (see "Target user operation" in the related information display correspondence table of FIG. 4), as shown in FIG. 6B, the consumables information 42c is displayed in the area 40. Since the content of the consumables information 42c is the content displayed by selecting and operating the tab 31 of "Home" (see FIG. 3B) but is the related information associated with the upload print (see "Related information to be displayed" in the related information display correspondence table of FIG. 4), the content of the consumables information 42c is displayed without performing the selection operation of the tab 31 of "Home".

The consumables information 42c illustrated in FIG. 6B indicates information regarding toners as cartridge information. Specifically, information including the remaining amount of each color of black, cyan, magenta, and yellow is displayed.

More specifically, the consumables information 42c includes an indication of "replacement require" that the black toner cartridge needs to be replaced because the remaining amount of black toner is as small as 5%, which calls attention. The user can select to give a print instruction after the cartridge replacement work is completed, because the number of prints is large, or to give a print instruction without replacing the cartridges, because the number of prints is small.

Here, the consumables information 42c displayed as the related information on the upload print includes information to alert the user in a case of upload print, but is not limited to this. In a case where the consumables information 42c does not include information to alert the user, for example, in a case where there is a remaining amount of each color of black, cyan, magenta, and yellow, the consumables information 42c (for example, see the information displayed in the area 40 of FIG. 3B) may be displayed.

Further, an example may be considered in which the display condition is that the consumables information 42c is surely displayed in a case where the information to alert the user is included in the related information of the upload print, and the consumables information 42c is not displayed in a case where the information to alert the user is not included. Such display conditions may be set by the tab 35 of "System settings" (see FIG. 3A).

Figure 7A:
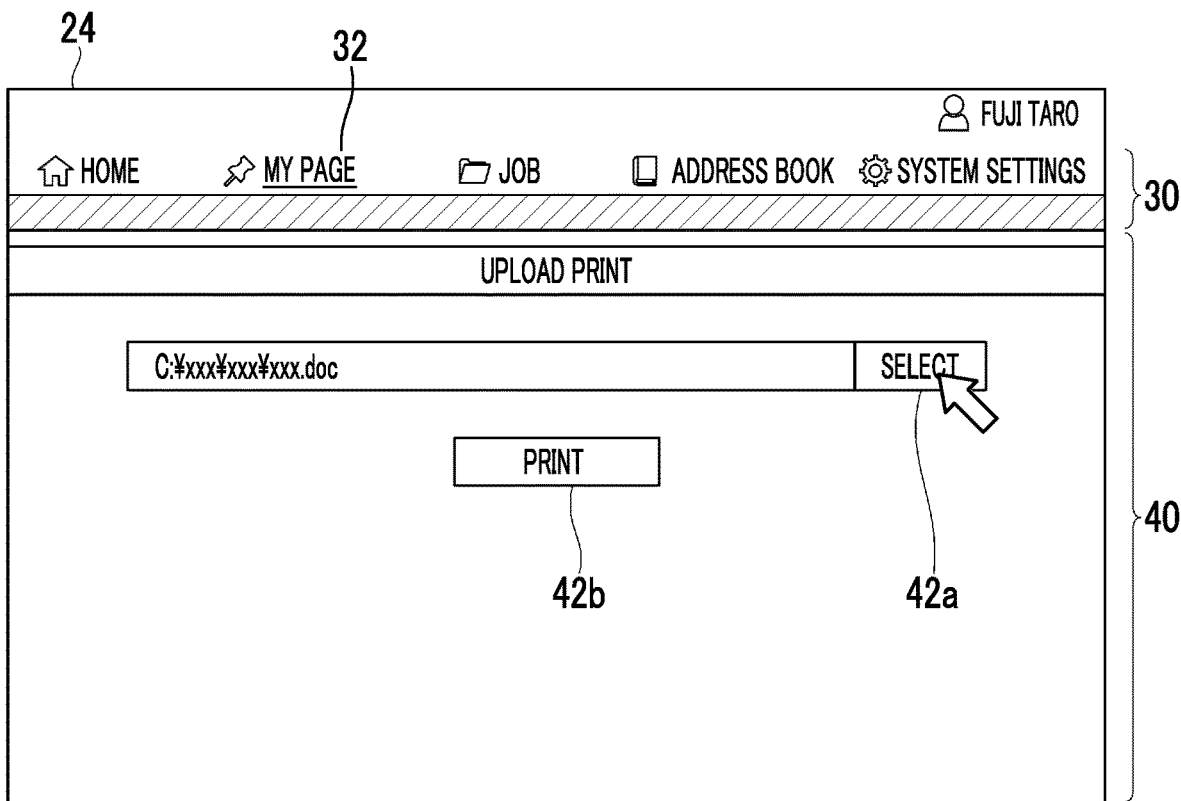
Figure 7B:
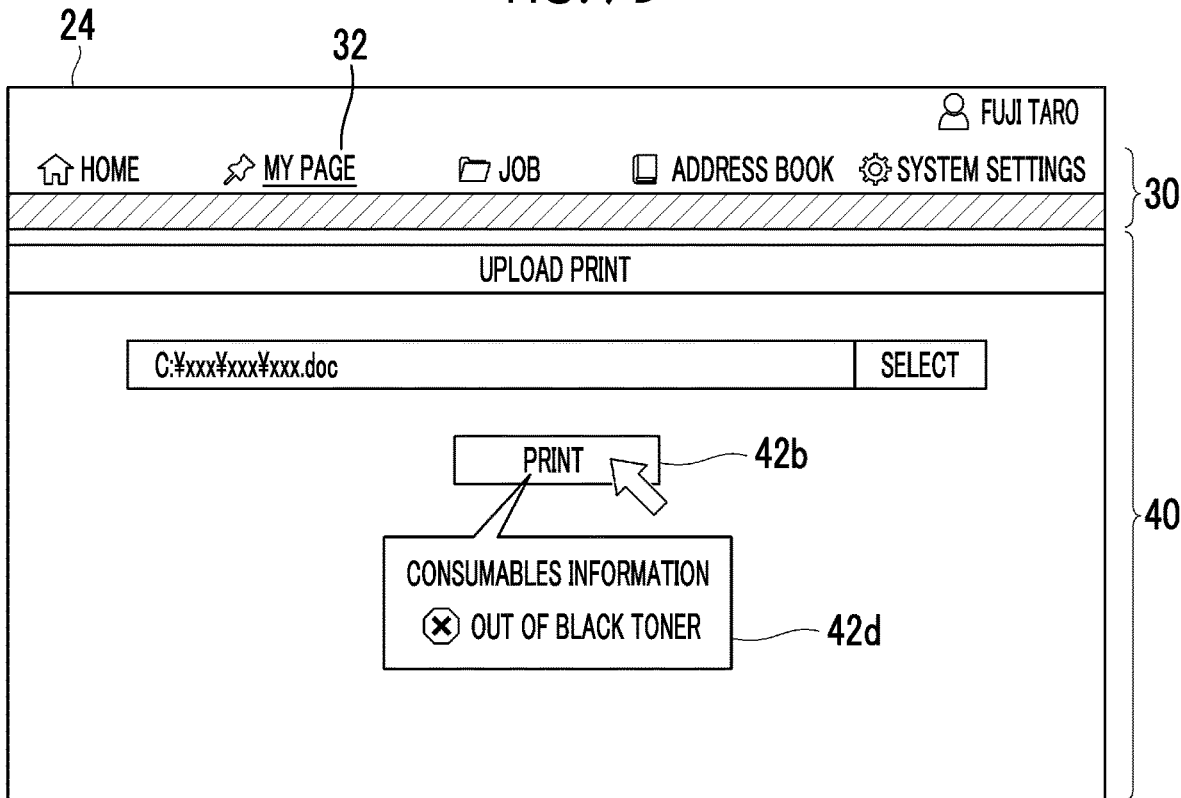

FIGS. 7A and 7B are views for explaining a second exemplary embodiment in which related information is displayed on the display unit 24, in which FIG. 7A shows a state where a file to be uploaded and printed is selected and operated, and FIG. 7B shows a state where the print operation is to be performed after FIG. 7A. Since FIG. 7A is the same as FIG. 6A, the description thereof will be omitted.

In a case where a file is selected on the upload print screen, as shown in FIG. 7B, in response to the user operation, consumables information 42d "Out of black toner" is displayed in the area 40 as related information of the upload print. The consumables information 42d is displayed by selecting and operating the tab 31 of "Home", but according to the related information display correspondence table, the consumables information 42d is displayed in the tab 32 of "My Page". Thus, it is possible to be notified of the occurrence of an error before the printing is executed, and it is possible to avoid the occurrence of an error and the handling therefor in a case where the printing is executed without notifying.

In addition, the consumables information 42d in FIG. 7B is different from the consumables information 42c in FIG. 6B and is error information, so that the consumables information 42d is displayed in a case where an error occurs, and is not displayed in a case where an error does not occur.

Figure 8A:
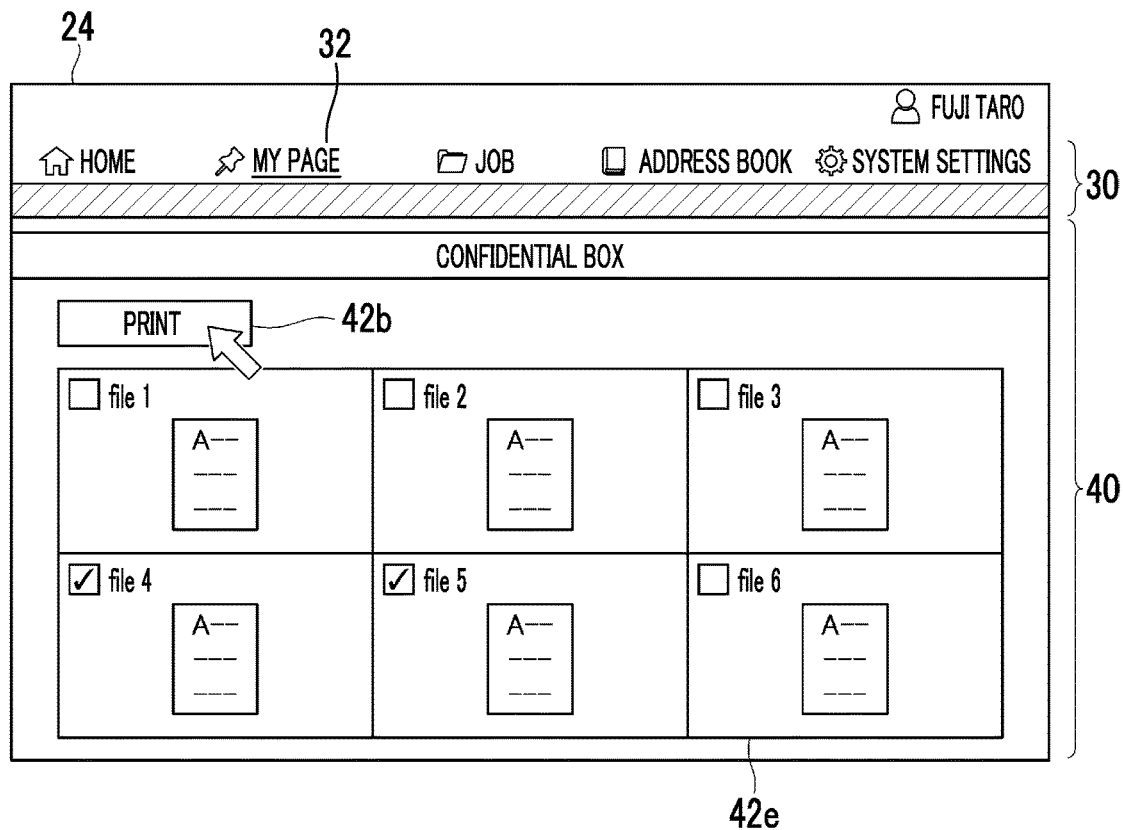
Figure 8B:
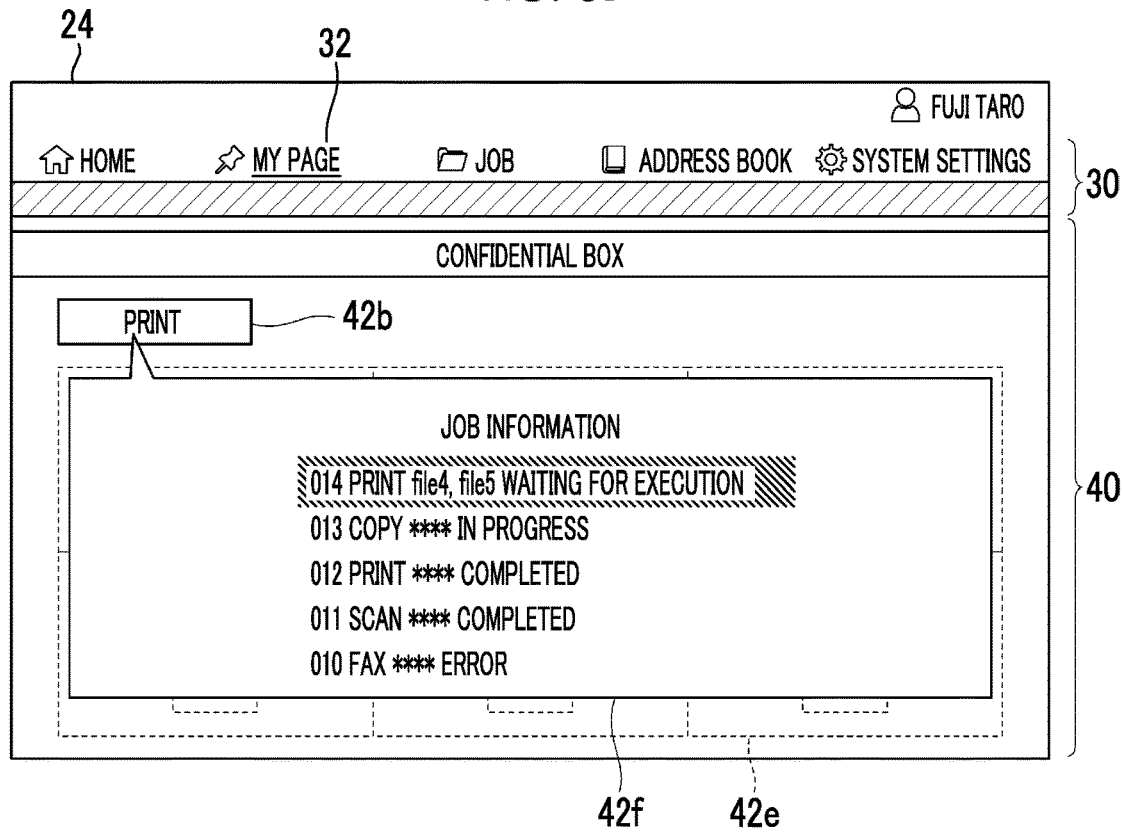

FIGS. 8A and 8B are views for explaining a third exemplary embodiment in which related information is displayed on the display unit 24, in which FIG. 8A shows a state where a file is selected and operated in a confidential box, and FIG. 8B shows a state where the print operation is to be performed after FIG. 8A.

As shown in FIG. 8A, in a case where the tab 32 of "My Page" in the tab area 30 of the display unit 24 is selected and operated and the screen shifts to the confidential box screen, the area 42e showing the confidential box and the area 42b for instructing the execution of printing are displayed in the display area 40. The user selects a file to print from the confidential box, in the area 42e.

After that, in a case where the area 42b for instructing the execution of printing is pressed, the job information 42f is displayed in the area 40, as shown in FIG. 8B, in response to the user operation. Since the content of the job information 42f is the content displayed by selecting and operating the tab 33 of "Job" (see FIG. 3A) but is the related information associated with the confidential box, the content of the job information 42f is displayed without performing the selection operation of the tab 33 of "Job".

The related information displayed includes "014 print file4, file5 waiting for execution" which is information on the jobs that have already been instructed to execute by the user, and includes information on the job by another user, for example, "013 copy **** in progress". Thus, the user can recognize the status of the job instructed by the user.

Note that some of the job information by other users is omitted and replaced with "*****".

Figure 9A:
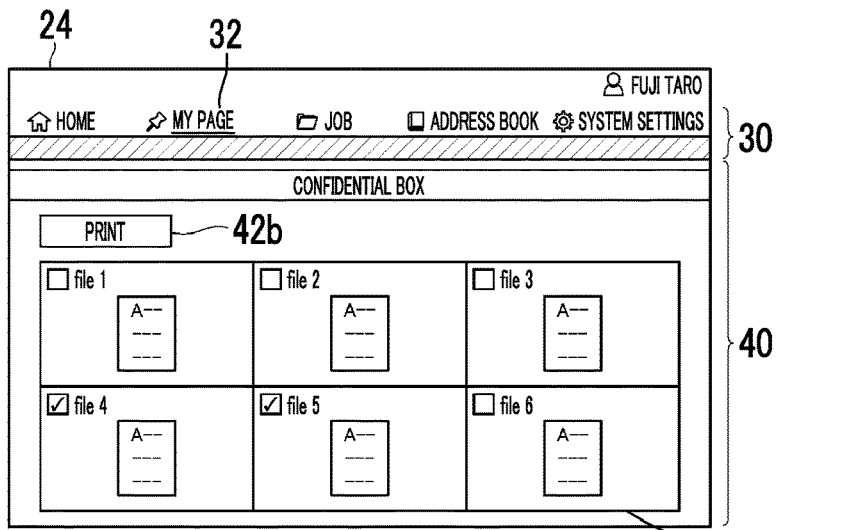
Figure 9B:
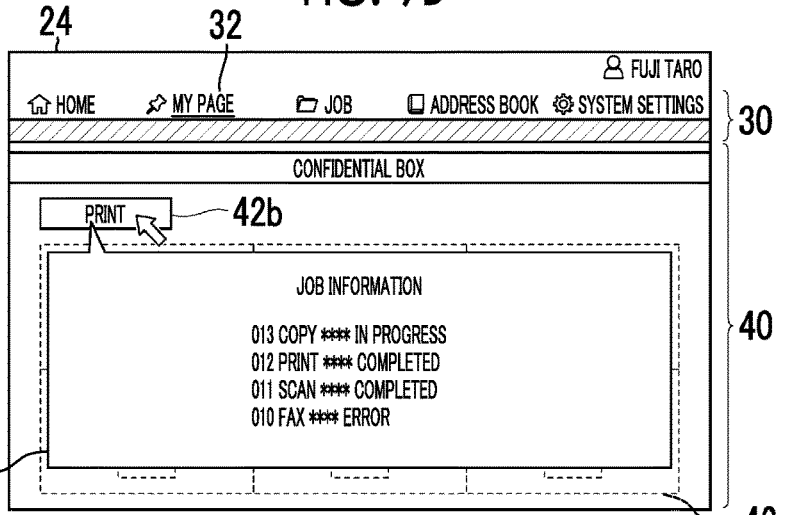
Figure 9C:
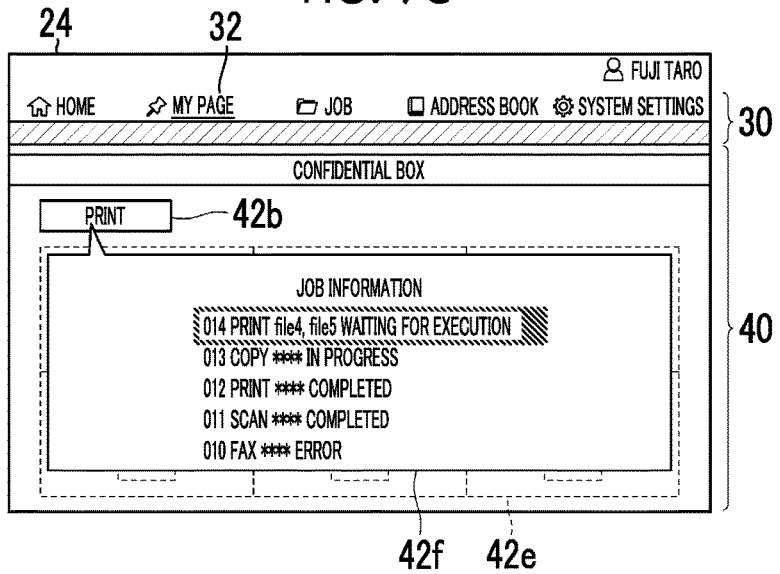

FIGS. 9A to 9C are views for explaining a fourth exemplary embodiment in which related information is displayed on the display unit 24, in which FIG. 9A shows a state where a file is selected and operated in a confidential box, FIG. 9B shows a state where the print operation is to be performed after FIG. 9A, and FIG. 9C shows a state where the print operation is performed. Note that FIGS. 9A and 9C correspond to FIGS. 8A and 8B described above.

As shown in FIG. 9A, the user selects a file to be printed from the confidential box in the area 42e, and then, as shown in FIG. 9B, in a case of hovering to the area 42b for instructing the execution of printing, the job information 42g at the stage before the instruction to execute the print of the confidential box is displayed. Thus, it is possible to check whether or not the print is smoothly performed even in a case where the print execution instruction is given.

Then, in a case where the area 42b is pressed, as shown in FIG. 9C, the job information 42f to which the information on the print execution of the confidential box is added is displayed. Thus, it is possible to check the job information 42f on the print execution for which the instruction has been given.

Figure 10A:
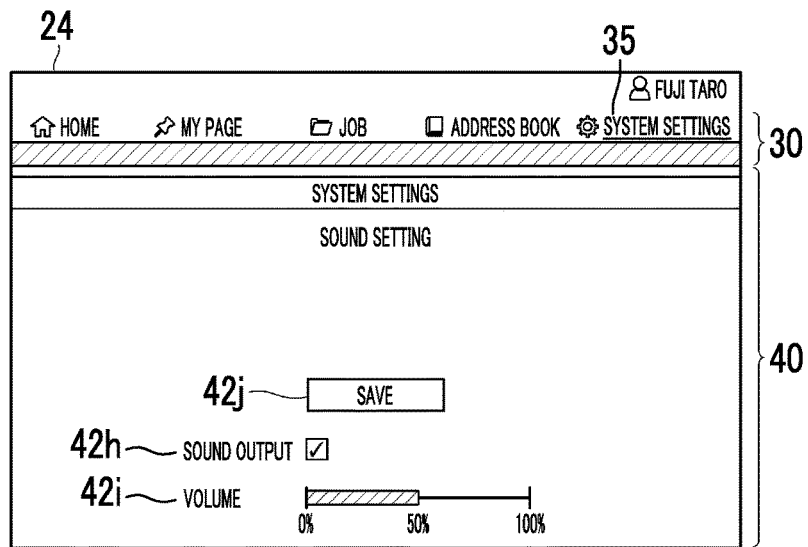
Figure 10B:
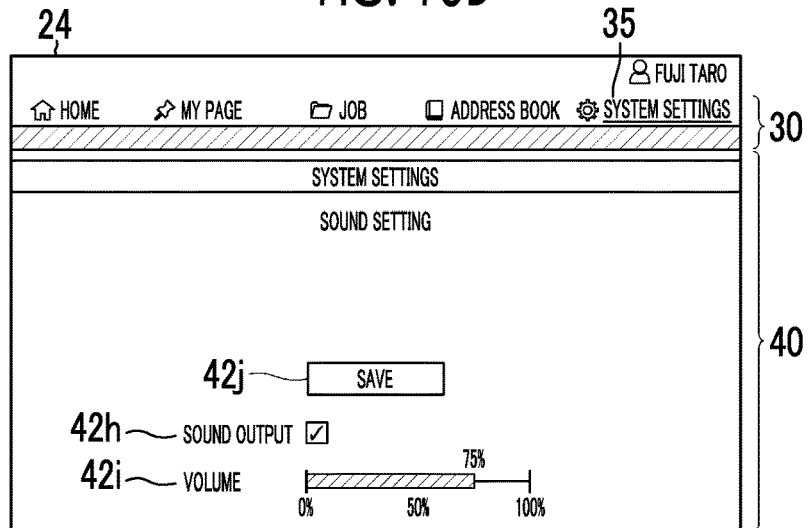
Figure 10C:
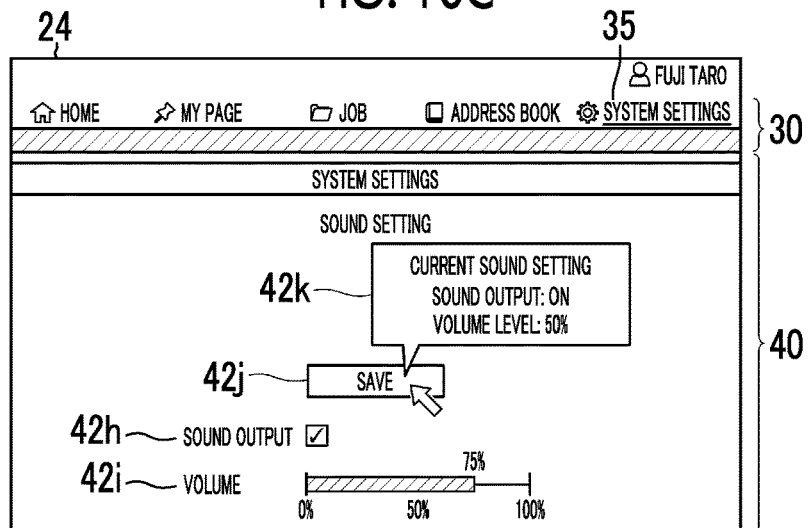

FIGS. 10A to 10C are views for explaining a fifth exemplary embodiment in which related information is displayed on the display unit 24, in which FIG. 10A shows a state where sound setting is performed in system settings, FIG. 10B shows a state where the sound setting is changed after FIG. 10A, and FIG. 10C shows a state where the change in the sound setting is to be saved.

In a case where the tab 35 is selected by the user, the system settings are displayed in the display area 40 of the display unit 24. The example shown in FIG. 10A is a sound setting screen, and an area 42h for setting the presence/absence of sound output, an area 42i for setting the volume, and an area 42j for instructing the saving of the sound setting are displayed in the display area 40.

The area 42h has a check box for setting whether or not to output sound, and it is possible to set whether or not to output sound by turning on/off the check box. Further, the area 42i has a bar for setting the volume, and the volume can be set by operating the bar. In the example shown in FIG. 10A, the sound output is on and the volume is 50%.

The user changes the setting of the bar in the area 42i to 75%, as shown in FIG. 10B, in order to set the volume to be increased. After that, as shown in FIG. 10C, in a case of hovering to the save button in the area 42j in order to save the setting change, as related information, the information 42k on the current sound setting before being changed by pressing the save button is displayed. The current sound setting information 42k is machine information, and is an example of information regarding the setting of the apparatus before changing the setting.

Thus, the save button can be pressed while visually recognizing the setting contents, and the operability of the user may be improved.

Here, the receiving unit 21, the transmitting unit 22, the operation detection unit 25, and the control unit 26 in the user terminal 20 can be configured by a Central Processing Unit (CPU) or a processor. The CPU reads the program stored in the Read Only Memory (ROM) and executes the program using the Random Access Memory (RAM) as a work area. The program to be executed by the CPU can be provided to a shared server (not shown) by being stored in a computer readable recording medium such as a magnetic recording medium (a magnetic tape, a magnetic disk, etc.), an optical recording medium (optical disk, etc.), an optical magnetic recording medium, or a semiconductor memory. Further, the program to be executed by the CPU may be downloaded to a shared server (not shown) using a communication means such as the Internet.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
 a processor configured to:
  acquire first information that is information on an apparatus associated with one selection element selectable by a user, and second information that is information on the apparatus associated with another selection element selectable by a user;
  display the first information and not the second information, in a case where the one selection element is selected, and display the second information and not the first information, in a case where the another selection element is selected, on a display unit that displays the one selection element and the another selection element;
  selecting an operation which is described as a part of the first information in a case where the first information is displayed on the display unit, wherein the operation is related to giving an operation instruction to the apparatus; and display the first information and the second information associated with the first information in response to selecting the operation, without performing an operation of selecting the other selection element.

2. The information processing apparatus according to claim 1, wherein the second information is information indicating a state of consumables of the apparatus.

3. The information processing apparatus according to claim 1, wherein the second information is information indicating a remaining amount of a recording medium accommodated in the apparatus.

4. The information processing apparatus according to claim 1, wherein the second information is information indicating an operating state of the apparatus.

5. The information processing apparatus according to claim 1, wherein the user operation is an operation of making setting for the apparatus, and
the second information is information regarding the setting for the apparatus before changing the setting.

6. The information processing apparatus according to claim 1,
wherein in a case where a user operation is performed on the display unit that displays the first information by the one selection element being selected and an error occurs in the operation of the apparatus executed by the user operation, the second information is displayed in addition to the first information.

7. The information processing apparatus according to claim 1,
wherein the second information displayed before a user operation is different from the second information displayed after the user operation on the display unit that displays the first information by the one selection element being selected.

8. A non-transitory computer readable medium storing a program causing an information processing apparatus to execute:
a function of acquiring first information that is information on an apparatus associated with one selection element selectable by a user, and second information that is information on the apparatus associated with another selection element selectable by a user;
a function of displaying the first information and not the second information, in a case where the one selection element is selected, and displaying the second information and not the first information, in a case where the another selection element is selected, on a display unit that displays the one selection element and the another selection element;
a function of selecting an operation which is described as a part of the first information in a case where the first information is displayed on the display unit, wherein the operation is related to giving an operation instruction to the apparatus; and
the program causing the information processing apparatus to display the first information and the second information associated with the first information in response to selecting the operation, without performing an operation of selecting the other selection element.

9. An information processing apparatus comprising:
means for acquiring first information that is information on an apparatus associated with one selection element selectable by a user, and second information that is information on the apparatus associated with another selection element selectable by a user;
means for displaying the first information and not the second information, in a case where the one selection element is selected, and displaying the second information and not the first information, in a case where the another selection element is selected, on a display unit that displays the one selection element and the another selection element;
means for selecting an operation which is described as a part of the first information in a case where the first information is displayed on the display unit, wherein the operation is related to giving an operation instruction to the apparatus; and
means for displaying the first information and the second information associated with the first information in response to selecting the operation, without performing an operation of selecting the other selection element.

* * * * *